US008912682B2

(12) United States Patent
Rozman et al.

(10) Patent No.: US 8,912,682 B2
(45) Date of Patent: Dec. 16, 2014

(54) POWER MANAGEMENT AND DISTRIBUTION CENTER FOR CONSTANT POWER LOADS

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 674 days.

(21) Appl. No.: 13/218,146

(22) Filed: Aug. 25, 2011

(65) Prior Publication Data

US 2013/0049465 A1 Feb. 28, 2013

(51) Int. Cl.
*B60L 1/00* (2006.01)

(52) U.S. Cl.
USPC .............................. 307/9.1; 307/11

(58) Field of Classification Search
USPC .................................................. 307/9.1, 11
See application file for complete search history.

(56) References Cited

U.S. PATENT DOCUMENTS 7,564,147 B2 7/2009 Michalko
8,536,730 B2 * 9/2013 Rozman et al. ................. 307/11

* cited by examiner

*Primary Examiner* — Robert L. Deberadinis
(74) *Attorney, Agent, or Firm* — Cantor Colburn LLP

(57) ABSTRACT

An electrical power system includes an electrical power generating system (EPGS); one or more constant power loads powered by the EPGS; and a power management and distribution (PMAD) center located between the EPGS and the one or more constant power loads, the PMAD center comprising a plurality of load management channels, each of the plurality of load management channels corresponding to a respective constant power load, wherein each of the plurality of load management channels comprises a load management function and a decoupling filter.

20 Claims, 6 Drawing Sheets

POWER MANAGEMENT AND DISTRIBUTION CENTER FOR CONSTANT POWER LOADS

FIELD OF INVENTION

The subject matter disclosed herein relates generally to the field of electric power generating and distribution systems.

DESCRIPTION OF RELATED ART

An electrical power system for a hybrid vehicle may include an electrical power generating system (EPGS) integrated with a power distribution system that distributes the power generated by the EPGS to a plurality of electrical loads. However, an electrical system including a high voltage direct current (DC) EPGS, such as may be included in a military hybrid vehicle, may have stability problems when used in conjunction with constant power loads. As shown in graph 100 of FIG. 1, while traditional resistance loads have linear voltage-current characteristics, an electrical system including constant power loads and a switched mode power converter may have nonlinear input voltage-current characteristics, which shows different responses to voltage changes.

Stability in an electrical power system is also dependent on the interactions between equipment from different vendors that is used with the EPGS. During the life of a vehicle, new electric loads are likely to be added. The electric power system design must be made sufficiently robust so that major system modifications are not necessary to accommodate new loads. Also, in an electrical power system including a switched mode power converter and a source ripple filter in conjunction with an EPGS and constant power loads, there is dynamic interaction between the power converter input filter and the source ripple filter. The source ripple filter attenuates rectification ripple and current harmonics resulting from active rectifier switching. The power converter input filter provides forward voltage attenuation of alternating current (AC) voltage superimposed on the DC bus voltage, attenuates current harmonics resulting from power converter switching that are injected into the DC bus to the levels allowed, and has a low output impedance so not to adversely affect the stability of the switched mode power converter. Lack of coordination between the design of the source ripple filter and the power converter input filter (which may be a motor drive or DC-DC converter) introduces possible instability for some operating conditions.

BRIEF SUMMARY

In one aspect, an electrical power system includes an electrical power generating system (EPGS); one or more constant power loads powered by the EPGS; and a power management and distribution (PMAD) center located between the EPGS and the one or more constant power loads, the PMAD center comprising a plurality of load management channels, each of the plurality of load management channels corresponding to a respective constant power load, wherein each of the plurality of load management channels comprises a load management function and a decoupling filter.

In another aspect, a power management and distribution (PMAD) center includes at least one load management channel, the at least one load management channel comprising a load management function and a decoupling filter, the at least one load management channel configured to power a respective constant power load.

In yet another aspect, a method of operating a load management channel located in a power management and distribution (PMAD) center located between an electrical power generating system (EPGS) and a constant power load, the load management channel comprising a load management function and a decoupling filter, the load management function comprising a positive rail contactor located on a positive rail, a negative rail contactor located on a negative rail, and an inrush-current limiting contactor, wherein the inrush-current limiting contactor is in series with a resistor, and wherein the inrush-current limiting contactor and the resistor are in parallel with the positive rail contactor on the positive rail includes during a power-up built-in test mode of the load management channel, opening the positive rail contactor, the negative rail contactor, and the inrush-current limiting contactor; during a pre-charge mode of the load management channel, opening the positive rail contactor, and closing the negative rail contactor and the inrush-current limiting contactor; during a load on mode of the load management channel, closing the positive rail contactor and the negative rail contactor; and during a fault isolation mode of the load management channel, opening the positive rail contactor, the negative rail contactor, and the inrush-current limiting contactor.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a power management and distribution (PMAD) center for use with an EPGS that powers constant power loads are provided, with exemplary embodiments being discussed below in detail. The PMAD center includes one or more load management channels. Each load management channel is dedicated to a constant power load in the electrical power system. The PMAD center load management channels are configured to achieve stable system operation, improve power quality on the system bus, and reduce filtering requirements at front-end of the individual constant power loads. Each load management channel comprises a two-stage filter, including a load management function and a decoupling filter. The pre-charge function at the individual constant power loads is eliminated by the PMAD center, and the weight, size, and cost of the overall system are also lowered by use of the PMAD center.

Figure 1:
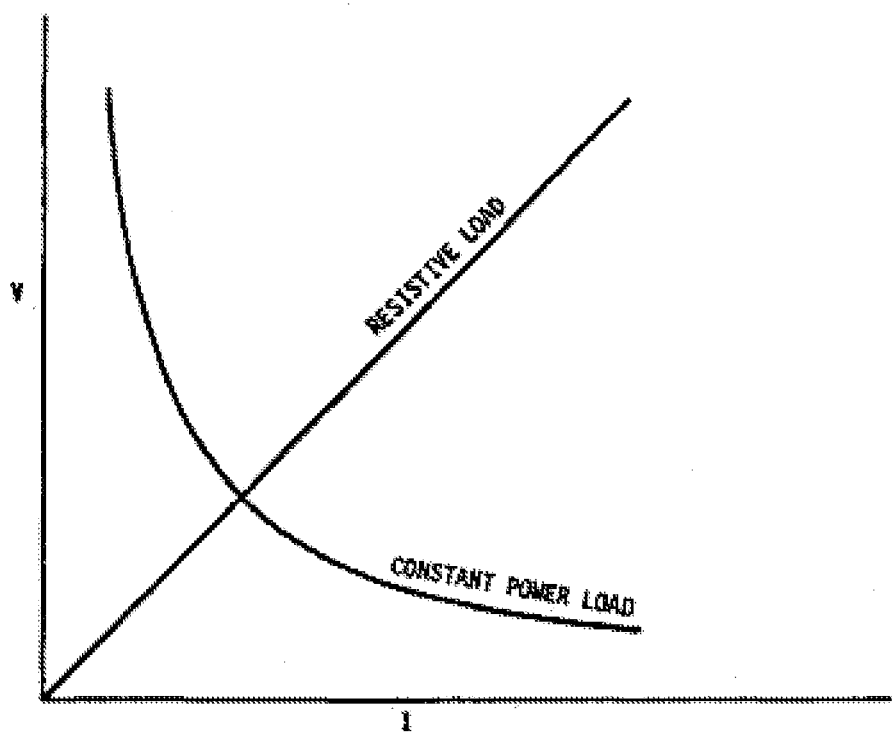
FIG. 1 illustrates a relationship between voltage and current for constant power loads and resistive loads.
Figure 2:
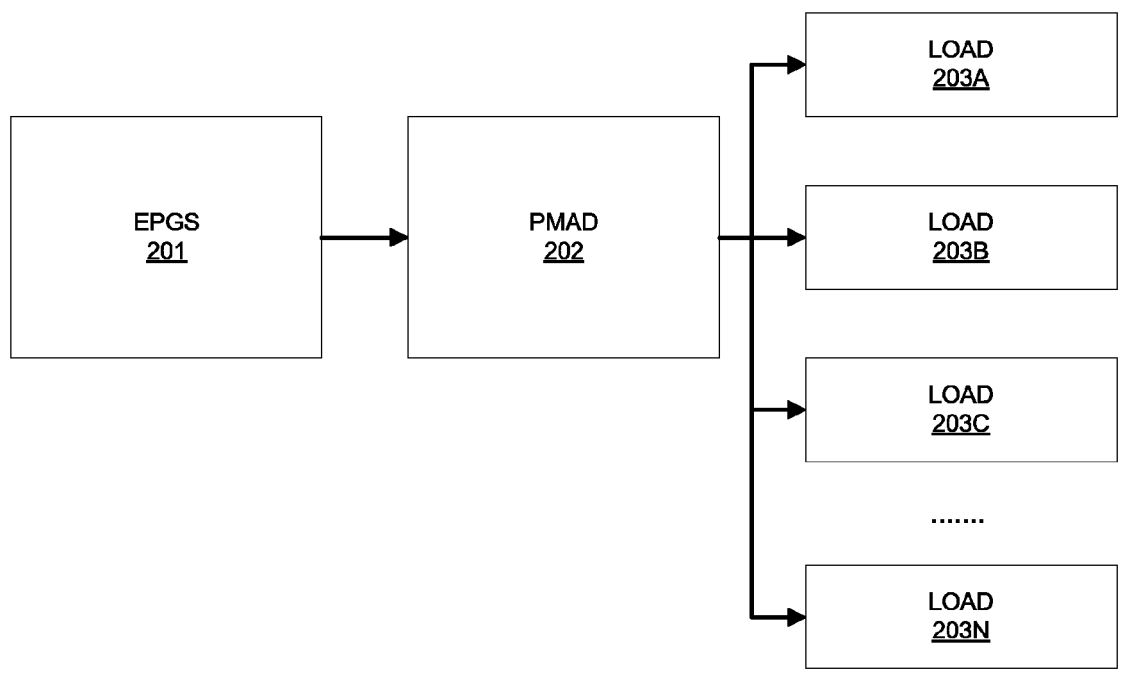
FIG. 2 illustrates an embodiment of an electrical power system including a power management and distribution (PMAD) center for constant power loads.

FIG. 2 illustrates an embodiment of electrical power system 200 including a PMAD center for constant power loads. In one embodiment, the EPGS 201 comprises a DC power generator. In an alternative embodiment, the EPGS 201 may include an alternating current (AC) power generator and a rectifier. Constant power loads 203A-N are powered by EPGS 201 via PMAD 202. The PMAD 202 includes a plurality of load management channels (discussed below in further detail with respect to FIGS. 3A and 4). In one embodiment, each load management channel is associated with a respective constant power load of constant power loads 203A-N. The electrical power system 200 may include any appropriate number of constant power loads 203, and may additionally comprise any appropriate number of resistive loads (not shown).

Figure 3A:
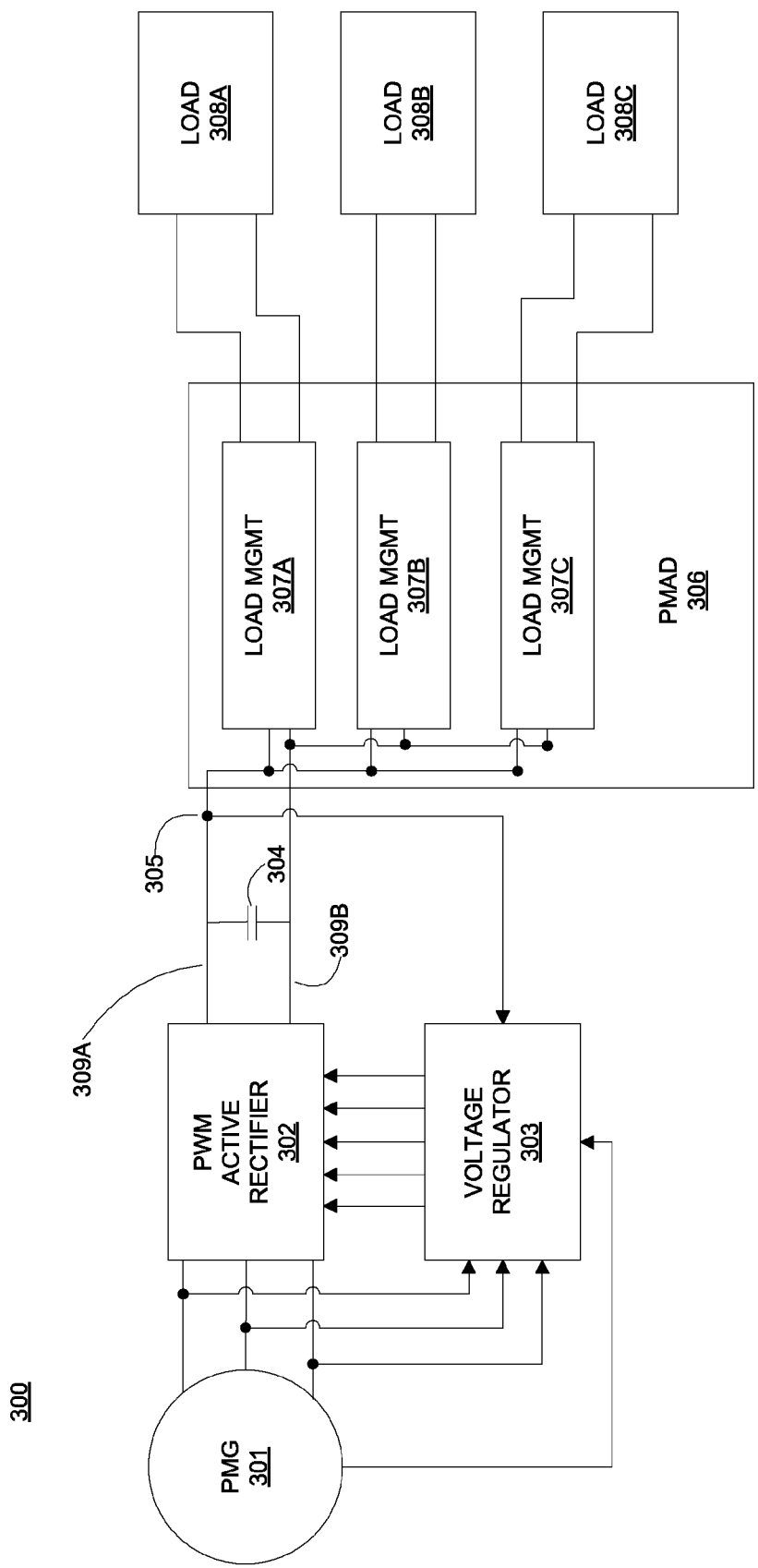
FIG. 3A illustrates another embodiment of an electrical power system including a PMAD center for constant power loads.
Figure 3B:
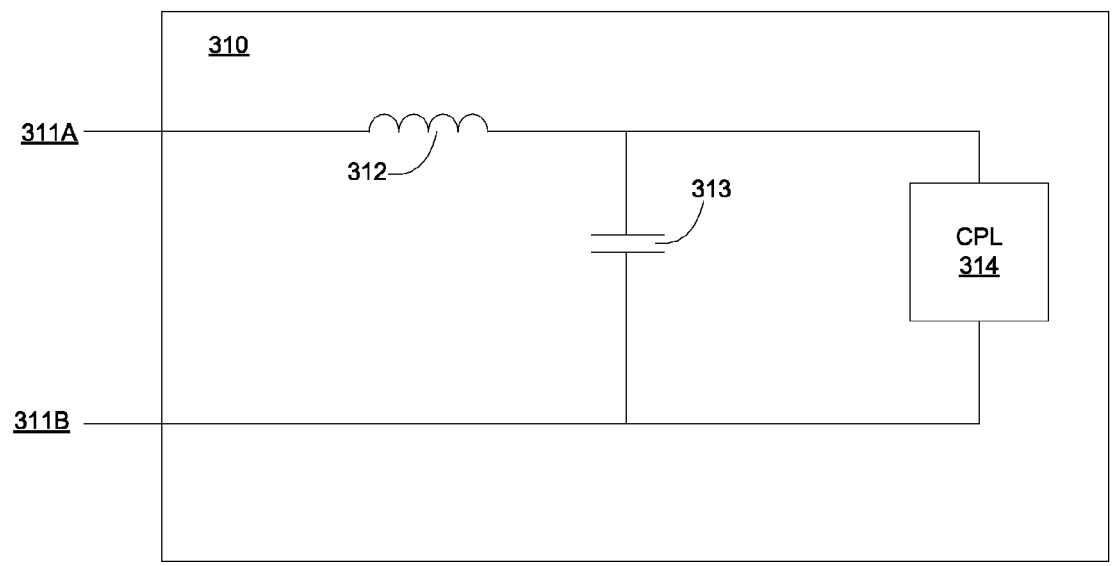
FIG. 3B illustrates an embodiment of a constant power load that may be used in conjunction with the electrical power system of FIG. 3A.

FIGS. 3A-B shows a detailed view of an electrical power system 300 including a PMAD center 306 for constant power loads according to one embodiment. In FIG. 3A, an EPGS is shown comprising a permanent magnet generator (PMG) 301 connected to pulse width modulated (PWM) active rectifier 302 and voltage regulator 303. PMG 301 is shown for illustrative purposes only; an electrical power system with a PMAD center 306 may include any appropriate type of generator. Capacitor 304 is connected between the positive rail 309A and negative rail 309B, and the conditions at point of regulation (POR) 305, located on the positive rail 309A, are used by the voltage regulator 303 to control the PWM active rectifier 302. PMAD center 306 comprises a plurality of load management channels 307A-C. Each load management channel 307A-C may correspond to a respective constant power load 308A-C. The PMAD center 306 may also include any number of additional load management channels (not shown) that may be used to add constant power loads to the electrical power system 300 during the life of the electrical power system 300. Each load management channel 307A-C has a respective positive rail and negative rail connections to the EPGS comprising the PMG 301, and a respective positive rail and negative rail connections to the load management channel's respective constant power load. The internal details of an exemplary individual constant power 308 are shown in FIG. 3B. Load 310 of FIG. 3B may comprise each of constant power loads 308A-B shown in FIG. 3A, and includes an input filter, comprised of components 312 and 313, and a constant power load 314, such as a dc-dc converter of a motor drive. Current flows from positive rail connection 311A through inductor 312 through capacitor 313 and constant power load 314 to negative rail connection 311B. Load management channels 307A-C and constant power loads 308A-C are shown for illustrative purposes only; an electrical power system may include any appropriate number of constant power loads and respective load management channels. The electrical power system 300 may also include any appropriate number of resistive loads (not shown) in some embodiments.

Figure 4:
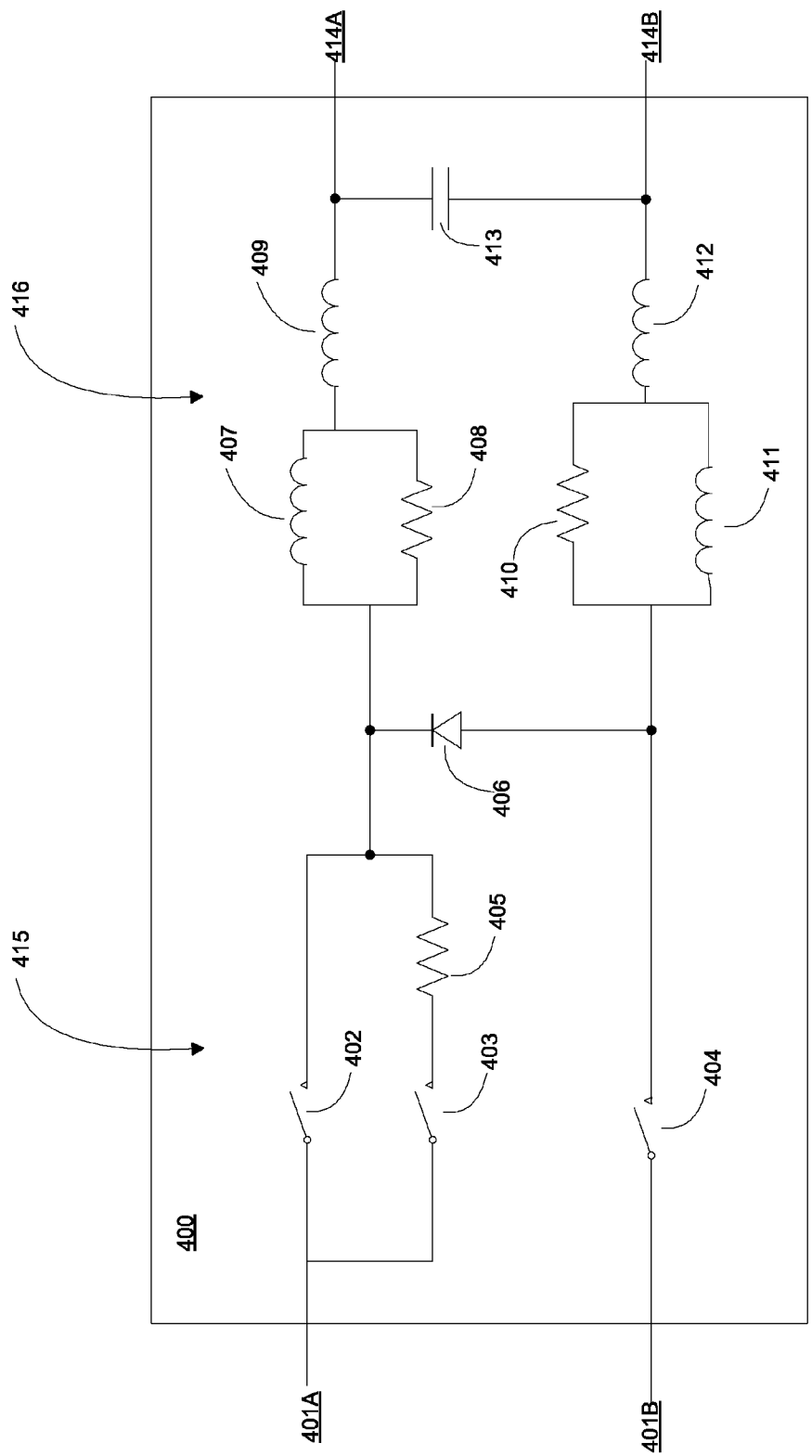
FIG. 4 illustrates a detailed embodiment of a load management channel.

FIG. 4 shows a detailed view of an individual load management channel 400 for a constant power load that is included in a PMAD center such as PMAD center 306 of FIG. 3A. Load management channel 400 may be included as any of load management channels 307A-C in PMAD center 306 of FIG. 3. The load management channel 400 includes load management function 415, and a decoupling filter 416. Decoupling filter 416 provides damping and filtering. The combination of the load management function 415 and a decoupling filter 416 in the load management channel 400 attenuates rectification ripple and current harmonics resulting from active rectifier switching as well as attenuation of current harmonics resulting from power converter switching on the system bus. The decoupling filter 416 improves decoupling between the loads and allows use of an under-damped input filter at the load side. Positive rail connection 401A and negative rail connection 401B receive power from the EPGS, and a constant power load is connected between positive load connection 414A and negative load connection 414B.

Load management function 415 includes three switches: positive rail contactor 402, inrush-current limiting contactor 403, and negative rail contactor 404. Positive rail contactor 402, inrush-current limiting contactor 403, and negative rail contactor 404 may be mechanical circuit breakers or solid-state switches in various embodiments. Current flows into load management channel 400 from positive rail connection 401A to positive rail contactor 402, which is in parallel with series inrush-current limiting contactor 403 and resistor 405. Negative rail contactor 404 is connected to the negative rail connection 401B. Overvoltage protection diode 406 bridges the positive rail and the negative rail. The load management function 415, including positive rail contactor 402, inrush-current limiting contactor 403, negative rail contactor, resistor 405, and overvoltage protection diode 406, provides power-up built-in test (PBIT), pre-charge, load on, and fault isolation modes. Because load management channel 400 includes a pre-charge function, this function does not need to be performed by the individual load controllers located in the individual constant power loads, resulting in improved electric power system integration of different loads in a vehicle that includes a PMAD including one or more load management channels 400.

The decoupling filter 416 acts to provide damping, and to reduce ripple on the bus, improving the quality of the power provided to the load that is connected to the load management channel 400 at positive load connection 414A and negative load connection 414B. On the positive rail, decoupling filter 416 includes inductor 407 in parallel with resistor 408. Parallel inductor 407 and resistor 408 are in series with inductor 409. On the negative rail, the decoupling filter 416 includes inductor 412, which is in series with parallel inductor 410 and resistor 411. Capacitor 413 bridges the positive and negative rails.

Figure 5:
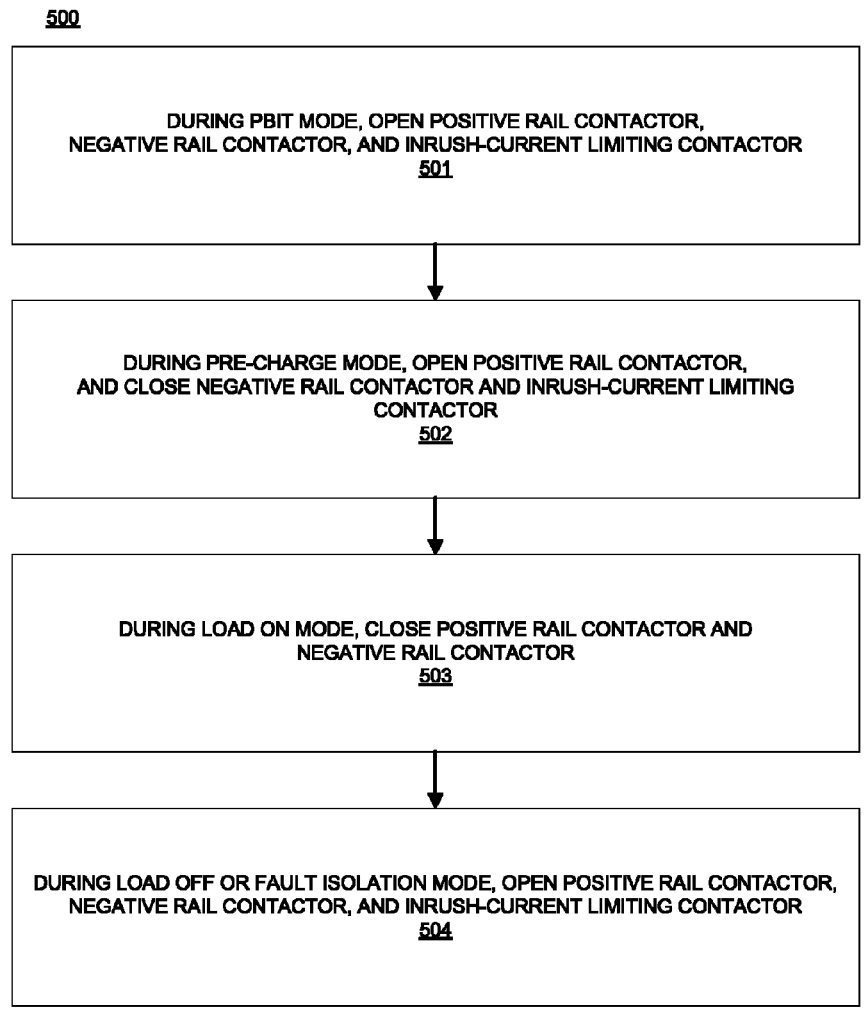
FIG. 5 illustrates a flowchart of an embodiment of a method of operating a load management function in a load management channel.

Operating modes for load management function 415 are described with respect to method 500 of FIG. 5. In block 501, during power-up built-in test (PBIT) mode, which occurs when the electrical power system including the load management channel is first powered up, positive rail contactor 402, inrush-current limiting contactor 403, and negative rail contactor 404 are all open. In block 502, during pre-charge mode, positive rail contactor 402 is open, and inrush-current limiting contactor 403 and negative rail contactor 404 are closed. The presence of resistor 405 in series with inrush-current limiting contactor 403 acts to limit the initial inrush current of the dc link capacitor of the constant power load that is connected to the load management channel 400 by connections 414A-B. In block 503, during load on mode (i.e., when the EPGS is powering the constant power load via the load management channel 400), positive rail contactor 402 and negative rail contactor 404 are closed. Inrush-current limiting contactor 403 is open during load on mode. Lastly, in block 504, during fault isolation or load off mode, positive rail contactor 402, inrush-current limiting contactor 403, and negative rail contactor 404 are all open.

The technical effects and benefits of exemplary embodiments include enhanced stability in an electrical power distribution system that includes an EPGS and constant power loads.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An electrical power system comprising:
   an electrical power generating system (EPGS);
   one or more constant power loads powered by the EPGS; and
   a power management and distribution (PMAD) center located between the EPGS and the one or more constant power loads, the PMAD center comprising a plurality of load management channels, each of the plurality of load management channels corresponding to a respective constant power load, wherein each of the plurality of load management channels comprises a load management function and a decoupling filter;
   wherein each load management function comprises a positive rail contactor located on a positive rail, a negative rail contactor located on a negative rail, and an inrush-current limiting contactor.

2. The electrical power system of claim 1, wherein the inrush-current limiting contactor is in series with a resistor, and wherein the inrush-current limiting contactor and the resistor are in parallel with the positive rail contactor on the positive rail.

3. The electrical power system of claim 1, wherein the load management function comprises a power-up built-in test mode, and wherein during the power-up built-in test mode, the positive rail contactor, the negative rail contactor, and the inrush-current limiting contactor are open.

4. The electrical power system of claim 1, wherein the load management function comprises a pre-charge mode, and wherein during the pre-charge mode, the positive rail contactor is open, and the negative rail contactor and the inrush-current limiting contactor are closed.

5. The electrical power system of claim 1, wherein the load management function comprises a load on mode, and wherein during the load on mode, the positive rail contactor and the negative rail contactor are closed.

6. The electrical power system of claim 1, wherein the load management function comprises a load off/fault isolation mode, and wherein during the load off/fault isolation mode, the positive rail contactor, the negative rail contactor, and the inrush-current limiting contactor are open.

7. The electrical power system of claim 1, wherein the load management function further comprises an overvoltage protection diode connected between the positive rail and the negative rail.

8. The electrical power system of claim 1, wherein each decoupling filter comprises an inductor in series with a parallel resistor and inductor located on a positive rail, and an inductor in series with a parallel resistor and inductor located on a negative rail.

9. The electrical power system of claim 8, wherein each decoupling filter further comprises a capacitor connected between the positive rail and the negative rail.

10. A power management and distribution (PMAD) center comprising:
    at least one load management channel, the at least one load management channel comprising a load management function and a decoupling filter, the at least one load management channel configured to power a respective constant power load;
    wherein the load management function comprises a positive rail contactor located on a positive rail, a negative rail contactor located on a negative rail, and an inrush-current limiting contactor.

11. The PMAD center of claim 10, wherein the inrush-current limiting contactor is in series with a resistor, and wherein the inrush-current limiting contactor and the resistor are in parallel with the positive rail contactor on the positive rail.

12. The PMAD center of claim 10, wherein the load management function comprises a power-up built-in test mode, and wherein during the power-up built-in test mode, the positive rail contactor, the negative rail contactor, and the inrush-current limiting contactor are open.

13. The PMAD center of claim 10, wherein the load management function comprises a pre-charge mode, and wherein during the pre-charge mode, the positive rail contactor is open, and the negative rail contactor and the inrush-current limiting contactor are closed.

14. The PMAD center of claim 10, wherein the load management function comprises a load on mode, and wherein during the load on mode, the positive rail contactor and the negative rail contactor are closed.

15. The PMAD center of claim 10, wherein the load management function comprises a load off/fault isolation mode, and wherein during the load off/fault isolation mode, the positive rail contactor, the negative rail contactor, and the inrush-current limiting contactor are open.

16. The PMAD center of claim 10, wherein the load management function further comprises an overvoltage protection diode connected between the positive rail and the negative rail.

17. The PMAD center of claim 10, wherein the decoupling filter comprises an inductor in series with a parallel resistor and inductor located on a positive rail, and an inductor in series with a parallel resistor and inductor located on a negative rail, and wherein the decoupling filter further comprises a capacitor connected between the positive rail and the negative rail.

18. A method of operating a load management channel located in a power management and distribution (PMAD) center located between an electrical power generating system (EPGS) and a constant power load, the load management channel comprising a load management function and a decoupling filter, the load management function comprising a positive rail contactor located on a positive rail, a negative rail contactor located on a negative rail, and an inrush-current limiting contactor, wherein the inrush-current limiting contactor is in series with a resistor, and wherein the inrush-current limiting contactor and the resistor are in parallel with the positive rail contactor on the positive rail, the method comprising:

during a power-up built-in test mode of the load management channel, opening the positive rail contactor, the negative rail contactor, and the inrush-current limiting contactor;

during a pre-charge mode of the load management channel, opening the positive rail contactor, and closing the negative rail contactor and the inrush-current limiting contactor;

during a load on mode of the load management channel, closing the positive rail contactor and the negative rail contactor; and during a load off/fault isolation mode of the load management channel, opening the positive rail contactor, the negative rail contactor, and the inrush-current limiting contactor.

19. An electrical power system comprising:

an electrical power generating system (EPGS);

one or more constant power loads powered by the EPGS; and a power management and distribution (PMAD) center located between the EPGS and the one or more constant power loads, the PMAD center comprising a plurality of load management channels, each of the plurality of load management channels corresponding to a respective constant power load, wherein each of the plurality of load management channels comprises a load management function and a decoupling filter;

wherein each decoupling filter comprises an inductor in series with a parallel resistor and inductor located on a positive rail, and an inductor in series with a parallel resistor and inductor located on a negative rail.

20. A power management and distribution (PMAD) center comprising:

at least one load management channel, the at least one load management channel comprising a load management function and a decoupling filter, the at least one load management channel configured to power a respective constant power load;

wherein the decoupling filter comprises an inductor in series with a parallel resistor and inductor located on a positive rail, and an inductor in series with a parallel resistor and inductor located on a negative rail, and wherein the decoupling filter further comprises a capacitor connected between the positive rail and the negative rail.

\* \* \* \* \*